April 20, 1937.　　　C. E. ROTH.　　　2,078,024

ARMATURE LEAD CONNECTION

Filed May 23, 1936

Inventor
Clement E. Roth
By Edwin T. Samuels
Attorney

Witness

Patented Apr. 20, 1937

2,078,024

UNITED STATES PATENT OFFICE 2,078,024

ARMATURE LEAD CONNECTION

Clement E. Roth, Towson, Md., assignor to The Black & Decker Manufacturing Company, a corporation of Maryland Application May 23, 1936, Serial No. 81,374

11 Claims. (Cl. 171—320)

In the winding of armatures it is necessary in many instances to use relatively fine wires, and where these are laid as is customary without reinforcement, from the coils to the commutator bars to which they are connected, they have a tendency to crystallize and break, particularly where the motors are used in any installation which tends to cause vibration of the motor.

Notable examples of this condition occur in motor driven hammer tools and other electric tools including electric wrenches and screw drivers, where the momentum of the rotating parts is applied by a hammering action to set nuts, bolts, screws and the like, which are driven by the tool.

Various constructions intended to overcome this difficulty have been devised and have been tested in actual use. One of these consists in twisting the two leads from each coil together before placing them in the commutator bar for soldering, thus giving mutual support and reinforcement. In other instances, a heavier wire is soldered to the two wires coming from the coil, and that wire is soldered to the commutator bar. None of these arrangements have, however, proved entirely satisfactory.

The object of the invention is to provide an improved lead construction. This has been found to completely overcome the difficulties suggested. A construction embodying the features of the invention in the preferred form is illustrated in the accompanying drawing.

Figure 1:
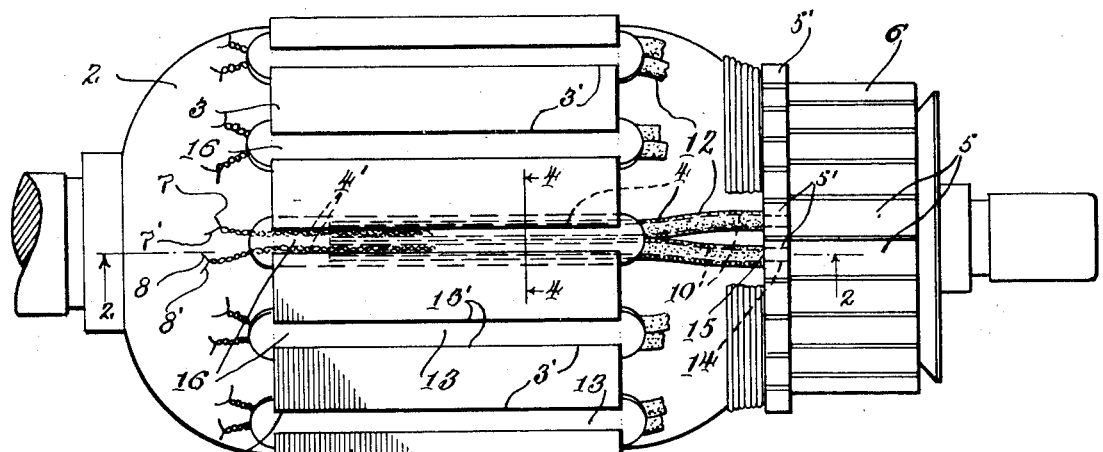
Figure 1 is a top plan view of the armature of a series type high speed motor or universal motor, showing the improved construction applied to the leads in one slot of the core connecting two coils to the corresponding commutator bars.
Figure 2:
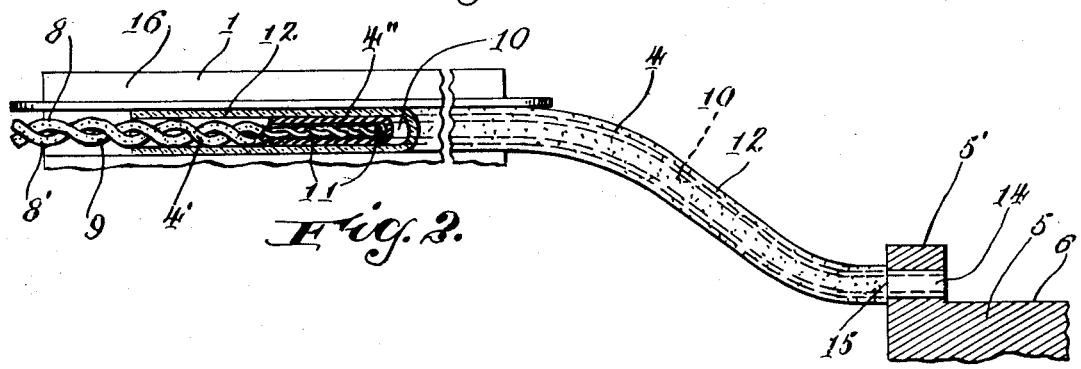
Figure 2 is a fragmentary view of the lead wires connected to a commutator bar looking at the lead from a plane indicated by the line 2—2 in Figure 1, the view being taken at right angles to the plane of Figure 1.

Referring to the drawing by numerals, each of which is used to indicate the same or similar parts in the different figures, the drawing, Figure 1, shows the armature 1 of a series type high speed motor generally termed a universal motor. This includes the usual winding 2, and laminated core 3 in the slots 3' of which the winding is placed in accordance with the prevailing practice. The improved leads 4 connect each coil to the corresponding bar 5 of the commutator 6. While but two leads located in a single core slot are illustrated, it is understood that the leads from the other coils would be similarly arranged.

In accordance with the standard method of machine winding, the insulated wire of which the coils are formed, is so arranged as to leave a loop between each coil. According to the improved construction, this loop is twisted and cut off at the end, leaving the lead wire ends which form the two sides of the loop, coiled or twisted each about the other after the manner of a two strand twisted cord or rope. The respective wire ends are indicated by reference characters 7, 7', 8, 8', and the combined twisted ends are shown at 4'. These wires as embodied in the respective coils are in accord with the regular practice covered with insulation indicated by reference character 9, the insulation being scraped from the end portions 4'' of the wire before twisting so that the wires 7, 7', and 8, 8', as to the combined twisted portion thereof, are in electrical contact. It will be noted that the coil wires are brought out at the back end of the armature for the purposes in hand.

When the lead wires 7, 7' have been combined in the manner described or in any suitable manner, the exact method of combining the wire ends being not essential to the invention in its broadest scope, the combined pairs of lead wire ends 7, 7' and 8, 8', are inserted as shown, each pair of twisted wires into a copper tube 10, of suitable diameter, to which they are soldered or otherwise metallically sealed at 11. An insulating sleeve or tube 12 of any suitable insulating material, the kind of tubing generally used being referred to in the trade as a treated sleeving, is then passed over the copper tube. This completes the insulated lead. This sleeving is of sufficient length to cover not only the copper tube 10, but also any uninsulated portion of the wire which may be outside the copper tube 10, and the sleeve 12 engages the insulation 9, which covers the wires within the coils and the coil wires where they extend from the coils to the tubes 10.

The insulating sleeves 12 enclose the tubes 10 down to the back of the commutator 6, to which they extend. The copper tubes 10 with the insulating sleeves 12, enclosing them, together with wire ends 4', forming the completed leads, are then placed in the corresponding core slots 16. Preferably they are placed side by side, two in a slot filling the lateral extent of the slot overlying the coil wires 2, and they are held by strips of fiber board 13 or similar material inserted over the leads 4 and under heads 13'. The ends 14 of the tubes 10, where they project at 15 from the insulating sleeve, are then soldered in and to the corresponding commutator bars 5 in the position of the usual lead wires being shown as joined to commutator bar heads 5'.

This gives a flexible lead connection from the coil to the commutator which is found to expand and contract with changes of the temperature in the motor, and to give with vibration so that no breakage in the lead occurs between the coil and the commutator. It will be appreciated that the copper tube 10 enclosed within the insulating tube or sleeve 12, is of a size adapted to fit in the armature slots 16 and to be thus supported therein, and that the copper tubes 10 are of high conductivity and not subject to heating by resistance, and of a structural shape which is adapted to withstand vibration for an extremely long period, whereas the lead wires in accordance with the previous construction are usually unsupported, it being very difficult to build up under the lead wires sufficiently to support them against vibration so that they have been found subject to crystallization and hence failure due to vibration and heating. While the members 10 are illustrated and referred to herein as of copper tube, it will be understood that this is the pfeferred form and that variations of material and structure are contemplated. While commercial tubing is cheap and is preferred for this purpose, the term "tube" is used in a broad sense, applying to an elongated bar or even a plate apertured or formed to provide a chamber within which the wire ends are inserted for soldering. This chamber need not be fluid tight or in any way adapted to serve as a passage for fluid. The tube 10 may be secured or metallicly sealed in the commutator in any suitable manner and likewise the wires in the tube 10.

Figure 3:
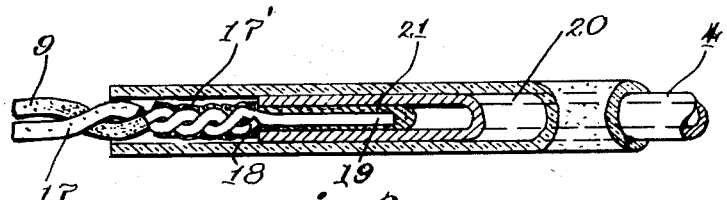
Figure 3 is a fragmentary section corresponding to Figure 2, showing a modification.
Figure 4:
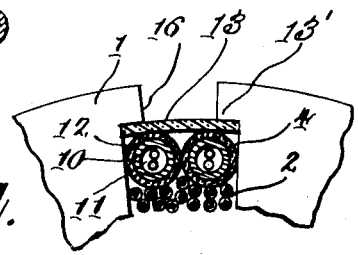
Figure 4 is a fragmentary section on the line 4—4 in Figure 1 showing two leads in a core slot.

In Figure 3 I have illustrated a modified form of the invention, which arrangement is adopted when the lead wires from the coil are so heavy that the two wires when twisted together are too large to enter the largest tube which can be admitted within the width of the commutator bar. In this instance the loop from the coil is twisted as indicated at 17, the insulation being first removed from the wires for a considerable portion of the length of the loop at and back from its end. One wire end is then cut off at 18 and removed and the wires are soldered together at 17' at the left of the cut end 18. This provides for the admission of one wire only into the tube 20 as shown at 19, the said end 19 being soldered at 21 as described regarding the twisted wire ends, in connection with the previous form of the invention. The construction is otherwise similar to that first described. In all instances other methods of conduction sealing than solder may be used.

The invention thus provides a lead connection of increased diameter and of hollow tubular construction which with the insulating covering fits and is adapted for convenient support in the armature slots in which it is longitudinally disposed extending beyond said slots to the corresponding commutator bar head, being preferably self supporting, between the commutator slots and the commutator and of sufficient resilience and lateral strength throughout so that it resists vibration and is not subject to failure within the period of life of the other parts of the motor. It also forms a most satisfactory connection from the coils to the armature which is of high capacity and long life as compared to the lead wires previously employed.

I have thus described specifically and in detail an improved armature construction embodying the features of the invention in the preferred form, the description being specific and in detail in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. Lead connections from the coils to the commutator bars of a series motor each comprising a tubular member of conducting material, metallicly connected at one end to a commutator bar, the coil wires corresponding to said bar taken from the rear of the coil being inserted and metallicly contacted within the other end of said tubular member, and an insulating sleeve enclosing the tube and contacting the wire insulation adjacent the coils, the insulated tubes being seated in the core slots and fitting closely therein.

2. A lead connection from the coils to the commutator bars of a series motor comprising a tubular member of conducting material, metallicly sealed at one end to a commutator bar, the coil wires corresponding to said bar taken from the rear of the coil being inserted and metallicly sealed within the other end of said tubular member, and insulating means enclosing said member and contacting the wire insulation adjacent the coil, the tube being seated in an armature slot within which said tubular members with the insulation thereon fit closely, thus avoiding destructive vibration, and affording increased capacity.

3. The combination with a series wound armature having a slotted core and wire coils and a commutator comprising commutator bars, of lead connections from the coils to the corresponding commutator bars, comprising an elongated conducting member, tubular insulation enclosing said member, the conducting member thus enclosed being seated in and closely engaged within a core slot, said member being chambered at the end to receive a pair of lead wires, the said lead wires being inserted and metallicly contacted therein, the tubular insulation engaging the insulation of the coil wires and the end of the conducting member opposite to that in which the coil ends are inserted being secured in a commutator bar head.

4. In a series wound armature a lead connection from the coil wires of each core to the corresponding commutator bar comprising a copper tube for each coil substantially parallel to the armature axis, the wire ends of the coil being twisted and inserted in the rear end of the tube and secured and contacted therein, the tube being coated with insulation and seated in an armature slot and having its forward end seated and secured and contacted in the corresponding commutator bar, the insulation covering the tube and wires from the commutator bar to the insulation on the wire adjacent the coil.

5. In a series wound motor a lead connection from the coil wires of each coil to the corresponding commutator bar comprising a longitudinally extending copper tube for each coil, the wire ends for the coil being combined and inserted in the rear end of the tube and secured and contacted therein, the tube being coated with insulation and seated in a corresponding armature slot and having the forward end seated and soldered in the corresponding commutator bar, the tube with the insulation thereon being supported substantially throughout the length of the core in the armature slot, thus preventing destructive vibration of the leads.

6. Lead connections for a rotary electric armature having a coil and a slotted core, said lead connections comprising externally insulated tubes of conducting metal connected to the lead wires of the coils, secured in the said slots and extending therefrom to the respective commutator bars to which they are electrically connected and in which they are supported.

7. Lead connections from the coils to the commutator of a rotary electric armature having coils and a slotted core, each lead connection comprising an elongated conductor covered with insulation and the conductor as thus covered being of sufficient diameter to fit closely within the armature slots, said conductors being chambered to receive the lead wires, which lead wires are metallicly sealed therein, the conductors being located in and extending longitudinally of the armature slots and being supported therein due to the dimensional relation and extending beyond the slots to the corresponding commutator heads in which the forward end of each conductor is supported and to which it is electrically connected.

8. Lead connections from the coils to the commutator bars of a rotary electric armature having coils and a laminated slotted core, each connection comprising a tubular member of conducting material coated with insulation, said members thus insulated being of sufficient size to fit closely within an armature slot whereby they are supported, the lead wires being secured and electrically connected to the rear ends of said tubular members which extend longitudinally through the slots and from the slots forwardly to the commutator, each said member being supported at its forward end in a corresponding commutator bar head and electrically connected thereto.

9. Lead connections from the coils to the commutator of an electric armature having coils, a slotted core and a commutator, each lead connection comprising an elongated conductor covered with insulation, each conductor thus covered being secured within the corresponding armature slot, said conductors being chambered at the end remote from the commutator to receive one lead wire which is conductively sealed therein, the lead wires from each coil being combined and electrically connected together, the said conductors extending beyond the slots to the corresponding commutator heads in one of which the forward end of each said conductor is supported, and to which it is electrically connected.

10. Lead connections from the coils to the commutator of a rotary electric armature having coils, a slotted core and a commutator, each lead connection comprising an elongated conductor of a cross section largely in excess of the cross section of the coil wire, each conductor being covered with insulation and each conductor thus covered being electrically connected to the corresponding coil wire and secured in the corresponding armature slot, the conductors extending longitudinally beyond the slots, each to the corresponding commutator head on which the forward end of the conductor is supported and to which it is electrically connected.

11. A lead connection from the coils to the commutator bars of a rotary electric armature each said lead connection comprising a metallic tubular member secured at one end to a commutator bar and electrically connected thereto, the tube being insulated externally and having a support on the armature for a portion of the tube spaced away from said commutator bar the coil ends corresponding to said bar being electrically connected to said tube near its end opposite to said commutator bar.

CLEMENT E. ROTH.